(12) United States Patent
El-Yaniv et al.

(10) Patent No.: US 10,831,444 B2
(45) Date of Patent: Nov. 10, 2020

(54) QUANTIZED NEURAL NETWORK TRAINING AND INFERENCE

(71) Applicant: Technion Research & Development Foundation Limited, Haifa (IL)

(72) Inventors: Ran El-Yaniv, Haifa (IL); Itay Hubara, Jerusalem (IL); Daniel Soudry, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 751 days.

(21) Appl. No.: 15/478,531

(22) Filed: Apr. 4, 2017

(65) Prior Publication Data

US 2017/0286830 A1  Oct. 5, 2017

Related U.S. Application Data

(60) Provisional application No. 62/317,665, filed on Apr. 4, 2016.

(51) Int. Cl.
*G06F 7/523* (2006.01)
*G06N 3/04* (2006.01)
(Continued)

(52) U.S. Cl.
CPC .............. *G06F 7/523* (2013.01); *G06F 7/48* (2013.01); *G06N 3/0454* (2013.01);
(Continued)

(58) Field of Classification Search
CPC ...... G06F 7/523; G06F 7/48; G06F 2207/482; G06N 3/04; G06N 3/08; G06N 3/084; G06N 3/0454; G06N 3/0481
See application file for complete search history.

(56) References Cited

U.S. PATENT DOCUMENTS

2016/0328646 A1* 11/2016 Lin .......................... G06N 3/08
2019/0073582 A1* 3/2019 Yang ................... G06K 9/00986

OTHER PUBLICATIONS

Courbariaux, Matthieu and Bengio, Yoshua "BinaryNet: Training Deep Neural Networks with Weights and Activations Constrained to +1 or −1." arXiv preprint arXiv:1602.02830v1, Feb. 9, 2016 (Year: 2016).*

(Continued)

*Primary Examiner* — Kamran Afshar
*Assistant Examiner* — Randall K. Baldwin (57) ABSTRACT

Training neural networks by constructing a neural network model having neurons each associated with a quantized activation function adapted to output a quantized activation value. The neurons are arranged in layers and connected by connections associated quantized connection weight functions adapted to output quantized connection weight values. During a training process a plurality of weight gradients are calculated during backpropagation sub-processes by computing neuron gradients, each of an output of a respective the quantized activation function in one layer with respect to an input of the respective quantized activation function. Each neuron gradient is calculated such that when an absolute value of the input is smaller than a positive constant threshold value, the respective neuron gradient is set as a positive constant output value and when the absolute value of the input is smaller than the positive constant threshold value the neuron gradient is set to zero.

17 Claims, 5 Drawing Sheets

(51) Int. Cl.
*G06F 7/48* (2006.01)
*G06N 3/08* (2006.01)
(52) U.S. Cl.
CPC .......... *G06N 3/0481* (2013.01); *G06N 3/084* (2013.01); *G06F 2207/4824* (2013.01)

(56) References Cited

OTHER PUBLICATIONS

Han, Song, Huizi Mao, and William J. Dally. "Deep compression: Compressing deep neural networks with pruning, trained quantization and huffman coding." arXiv preprint arXiv:1510.00149v5, Feb. 15, 2016, pp. 1-14 (Year: 2016).*

Courbariaux et al. "BinaryNet: Training Deep Neural Networks with Weights and Activations Constrained to +1 or −1." arXiv preprint arXiv:1602.02830v3, Mar. 17, 2016 (Year: 2016).*

Miyashita, Daisuke, Edward H. Lee, and Boris Murmann. "Convolutional neural networks using logarithmic data representation." arXiv preprint arXiv:1603.01025v2 Mar. 17, 2016 (Year: 2016).*

Hubara, Itay, Daniel Soudry, and Ran El Yaniv. "Binarized Neural Networks." arXiv preprint arXiv:1602.02505 (8 Feb. 9 2016). (Year: 2016).*

* cited by examiner

| Data set | MNIST | SVHN | CIFAR-10 |
|---|---|---|---|
| BNN (Torch7) Binarized activations+weights, during training and test | 1.40% | 2.53% | 10.15% |
| Committee Machines' Array (Baldassi et al. 2015) | 1.35% | - | - |
| BinaryConnect (Courbariaux et al. 2015) Binarized weights, during training and test | 1.29±0.08% | 2.30% | 9.90% |
| EBP (Cheng et al. 2015) Binarized activations+weights, during test | 2.2±0.1% | - | - |
| Bitwise DNNs (Kim & Smaragdis 2016) | 1.33% | - | - |
| (Hwang & Sung 2014) Ternary weights, binary activations, during test | 1.45% | - | - |
| No regularization No binarization (standard results) | 1.3±0.2% | 2.44% | 10.94% |
| Gated pooling (Lee et al. 2015) | - | 1.69% | 7.62% |

FIG. 3

Table 2: Energy consumption of multiply-accumulations in pico-joules (Horowitz, 2014)

| Operation | MUL | ADD |
|---|---|---|
| 8bit Integer | 0.2pJ | 0.03pJ |
| 32bit Integer | 3.1pJ | 0.1pJ |
| 16bit Floating Point | 1.1pJ | 0.4pJ |
| 32bit Floating Point | 3.7pJ | 0.9pJ |

FIG. 4

Table 3: Energy consumption of memory accesses in pico-joules (Horowitz, 2014)

| Memory size | 64-bit memory access |
|---|---|
| 8K | 10pJ |
| 32K | 20pJ |
| 1M | 100pJ |
| DRAM | 1.3-2.6nJ |

QUANTIZED NEURAL NETWORK TRAINING AND INFERENCE

RELATED APPLICATIONS

This application claims the benefit of priority under 35 USC § 119(e) of U.S. Provisional Patent Application No. 62/317,665 filed on Apr. 4, 2016, the contents of which are incorporated herein by reference in their entirety.

FIELD AND BACKGROUND OF THE INVENTION

The present invention, in some embodiments thereof, relates to neural networks and, more specifically, but not exclusively, to training neural networks and using trained neural networks.

Deep Neural Networks (DNNs) have substantially pushed Artificial Intelligence (AI) limits in a wide range of tasks. Today, DNNs are almost exclusively trained on one or many very fast and power-hungry Graphic Processing Units (GPUs). In a training phase, networks are being trained by large quantities of parameters for solving multi parameter and/or objective problems. When training a neural network, training data is put into the first layer of the network, and he network parameters are changed to as to fit the task at hand, for example how correct or incorrect it is, based on the task being performed.

Commonly, the trained neural network is put to work out in the digital world using what it has learned for recognizing images, spoken words, a disease, and/or suggesting promotional content or products in the streamlined form of an application. The trained network infers conclusions about new data it's presented with, based on its training. In the artificial intelligence (AI) lexicon this is known as "inference."

SUMMARY OF THE INVENTION

According to some embodiments of the present invention, there is provided a method for training neural networks. The method comprises constructing a neural network model having a plurality of neurons each associated with a quantized activation function adapted to output a quantized activation value selected from a first finite set, the plurality of neurons are arranged in a plurality of layers and being connected by a plurality of connections each associated with a quantized connection weight function adapted to output a quantized connection weight value selected from a second finite set, receiving a training set dataset, using the training set dataset to train the neural network model according to respective the quantized connection weight values, the training includes computing a plurality of weight gradients for backpropagation sub-processes by: computing a plurality of neuron gradients, each the neuron gradient is of an output of a respective the quantized activation function in one layer of the plurality of layers with respect to an input of the respective quantized activation function and is calculated such that when an absolute value of the input is smaller than a positive constant threshold value, the respective neuron gradient is set as a positive constant value and when the absolute value of the input is smaller than the positive constant threshold value the neuron gradient is set to zero, and updating a plurality of floating point connection weight values according to the plurality of weight gradients. The method further comprises outputting a trained quantized neural network formed as an outcome of the training process.

Optionally, each of the plurality of connections is associated with one of the plurality of floating point connection weight values.

Optionally, the neural network model is a convolutional neural network (CNN) model and the trained quantized neural network is a trained quantized CNN.

Optionally, the quantized activation function is a binary function and the quantized activation value is a binary value.

Optionally, the quantized connection weight function is a binary function and the quantized connection weight value is a binary value.

Optionally, quantized connection weight value and the quantized activation value are binary values.

Optionally, the quantized activation function and the quantized connection weight function are deterministic functions.

Optionally, the quantized activation function and the quantized connection weight function are stochastic functions.

More optionally, the stochastic functions are hard sigmoid functions.

Optionally, the input is batch normalized.

Optionally, the input is scaled and shifted according to at least one constant value.

Optionally, the input is scaled and shifted according to a batch normalization calculated by approximating variance of values of at least one minibatch of the training set and normalizing the values of the at least one minibatch of the training set.

More optionally, multiplications of the batch normalization are performed using left and right bit-shift operations.

More optionally, the method further comprises updating the plurality of floating-point connection weight values during the backpropagation sub-processes by performing multiplication operations using left and right bit-shift operations.

According to some embodiments of the present invention, there is provided a system for training neural networks. The system comprises a storage comprising a neural network model having a plurality of neurons each associated with a quantized activation function adapted to output a quantized activation value selected from a first finite set, the plurality of neurons are arranged in a plurality of layers and being connected by a plurality of connections each associated with a quantized connection weight function adapted to output a quantized connection weight value selected from a second finite set, at least one processor coupled to the storage for executing a code comprising, using a training set dataset to train the neural network model according to respective the quantized connection weight values, the training includes computing a plurality of weight gradients for backpropagation sub-processes by: computing a plurality of neuron gradients, each the neuron gradient is of an output of a respective the quantized activation function in one layer of the plurality of layers with respect to an input of the respective quantized activation function and is calculated such that when an absolute value of the input is smaller than a positive constant threshold value, the respective neuron gradient is set as a positive constant value and when the absolute value of the input is smaller than the positive constant threshold value the neuron gradient is set to zero, and updating a plurality of floating point connection weight values according to the plurality of weight gradients, and outputting a trained quantized neural network formed as an outcome of the training process.

According to some embodiments of the present invention, there is provided a method for using a trained neural network. The method comprises providing a neural network trained by a training set and having a plurality of neurons each associated with a quantized activation function adapted to output a quantized activation value selected from a first finite set, the plurality of neurons are arranged in a plurality of layers and being connected by a plurality of connections each associated with a quantized connection weight value selected from a second finite set, receiving a new data element, using the neural network trained for inferencing a conclusion regarding the data element by at least one forward pass process during which only bitwise operations are held to multiply respective the quantized connection weight values and respective the quantized activation values, and outputting the conclusion.

Optionally, the bitwise operations are XNOR-count operations and population count, operations.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to quantized neural networks and, more specifically, but not exclusively, to training quantized neural networks and using trained quantized neural networks.

According to some embodiments of the present invention, there are provided methods and systems for training a quantized neural network by using, during forward and backward propagation quantized, optionally binary, outputs of connection weight functions which are associated with connections and outputs of activation functions which are associated with neurons of the quantized neural network. During the training, floating-point values of the connections are stored and used for the training.

Optionally, during the training, batch normalization values of the neurons are stored and used for the training.

According to some embodiments of the present invention, there are provided methods and systems for inferring conclusions regarding new data by using a trained quantized neural network having quantized weight values, optionally binary, for each connection and a quantized activation functions associated with each neuron. During the training, quantized values of both the connections and the activation are used for example for inference.

It is often a challenge to run DNNs on target low-power devices, and substantial research efforts are invested in speeding up DNNs at run-time on both general-purpose (Gong, Y, Liu, L., Yang, M., and Bourdev, L. Compressing deep convolutional networks using vector quantization and Han, S., Pool, J., Tran, J., and Dally, W. Learning both weights and connections for efficient neural network which are incorporated herein by reference) and specialized computer hardware (Chen, T., Du, Z., Sun, N., et al. Diannao: A small-footprint high-throughput accelerator for ubiquitous machine learning and Esser, S. K., Appuswamy, R., Merolla, P., Arthur, J. V., and Modha, D. S. Backpropagation for energy-efficient which are incorporated herein by reference).

Some embodiments of the present invention provide training methods and systems for training fully quantized or binarized neural networks, at run-time, and when computing parameter gradients also referred to as weight gradients, at train-time of training phase.

Below are presented examples, implemented on Torch7, which show that it is possible to train the neural networks which are described herein on MNIST, CIFAR-10 and SVHN datasets and achieve near state-of-the-art results with improved computation (reduced computational consumption). Moreover, an example on the ImageNet dataset indicates that during the forward pass (both at run-time and train-time), the DNNs trained as described herein drastically reduce memory consumption (e.g. size and number of memory accesses), and replace arithmetic operations, optionally most of them, with bit-wise operations, which lead to an increase in power-efficiency (see Section 30th Conference on Neural Information Processing Systems (NIPS 2016), Barcelona, Spain. 3). Moreover, a quantized CNN such as a binarized CNN can lead to binary convolution kernel repetitions and implementing the training processes described herein on a dedicated hardware can reduce time complexity by 60% as a binarized CNN requires less arithmetic operations and consumes less memory.

It should be noted that until recently the use of extremely low precision networks (binary in the extreme case) was believed to be highly destructive to the network performance (Courbariaux et al., 2014). In Soudry, D., Hubara, I., and Meir, R. "Expectation backpropagation: Parameter-free training of multilayer neural networks with continuous or discrete weights" in NIPS'2014, and in Cheng, Z., Soudry, D., Mao, Z., and Lan, Z. "Training binary multilayer neural networks for image classification using expectation backpropgation" ArXiv preprint arXiv:1503.03562, 2015 which are incorporated herein by reference it has been proven that good performance could be achieved even if all neurons and weights are binarized to ±1. This was done using Expectation BackPropagation (EBP), a variational Bayesian approach, which infers networks with binary weights and neurons by updating the posterior distributions over the weights. These distributions are updated by differentiating their parameters (e.g., mean values) via the back propagation (BP) algorithm. Esser, S. K., Appuswamy, R., Merolla, P., Arthur, J. V., and Modha, D. S. Backpropagation for energy-efficient which is incorporated herein by reference taught implementing a fully binary network at run time using a similar approach to EBP, showed significant improvement in energy efficiency. The drawback of EBP is that the binarized parameters are only used during inference time and not during the training phase. The probabilistic idea behind EBP was extended in the BinaryConnect algorithm of Courbariaux, M., Bengio, Y., and David, J.-P. Binaryconnect: Training deep neural networks with binary weights during propagations, ArXiv e-prints, abs/1511.00363, November 2015, which is incorporated herein by reference. In BinaryConnect, the real-valued version of the weights is saved and used as a key reference for the binarization process. The intuition behind BinaryConnect is that the binarization noise is independent between different weights, either by construction (by using stochastic quantization) or by assumption (a common simplification; see Spang (1962). The noise would have little effect on the next neuron's input because the input is a summation over many weighted neurons. Thus, the real-valued version could be updated by the back propagated error by simply ignoring the binarization noise in the update. The first description of binarization of weights in CNNs is found in Courbariaux, M., Bengio, Y., and David, J.-P. Binaryconnect: Training deep neural networks with binary weights during propagations, ArXiv e-prints, abs/1511.00363, November 2015 which is incorporated herein by reference. This reference also teaches that noisy weights provide a form of regularization, which could help to improve generalization, as previously shown in Wan, L., Zeiler, M., Zhang, S., LeCun, Y., and Fergus, R. Regularization of neural networks using dropconnect which is incorporated herein by reference in ICML'2013. Binaryconnect binarized weights while still maintaining full precision neurons. Lin, Z., Courbariaux, M., Memisevic, R., and Bengio, Y. Neural networks with few multiplications, ArXiv e-prints, abs/1510.03009, October 2015 which is incorporated herein by reference carried over the work of —Binaryconnect.—They suggested converting some of the remaining multiplications into bit-shifts operations by restricting the neurons values to be power-of-two integers.—Lin.Z et al work used full precision weights during the inference phase and quantized—the neurons only during back propagation processes and not during forward propagation processes. Baldassi, C., Ingrosso, A., Lucibello, C., Saglietti, L., and Zecchina, R. Subdominant Dense Clusters Allow for Simple Learning and High Computational Performance in Neural Networks with Discrete Synapses, Physical Review Letters, 115(12):1-5, 2015 which is incorporated herein by reference teaches that full binary training and inference is possible in an array of committee machines with randomized input, where only one weight layer is being adjusted. Gong, Y., Liu, L., Yang, M., and Bourdev, L. Compressing deep convolutional networks using vector quantization suggests compressing a fully trained high precision network by using a quantization or matrix factorization methods that require training a network with full precision weights and neurons thus requiring numerous multiple accumulate (MAC) operations which are avoided in the training process described herein. Hwang, K. and Sung, W. Fixed-point feedforward deep neural network design using weights +1, 0, and −1. In Signal Processing Systems (SiPS), 2014 IEEE Workshop on, pp. 1-6. IEEE, 2014 which is incorporated herein by reference suggests a fixed-point neural network design that achieves performance almost identical to that of the floating-point architecture.

Some embodiments of the present invention succeed in binarization of both weights and neurons, both at the inference phase and at the entire training phase of a neural network. Optionally, the binarization of neuron and weight values is done stochastically and/or approximated as random noise. The binarization of neuron values, also known as activations, is useful in CNNs where there are typically many more neurons than weights. This allows highly efficient operation of the binarized DNN at run time, and at the forward\backward-propagation phase during training. Moreover, the described training method has almost no multiplications, and therefore might be implemented efficiently in dedicated hardware such as the FPGA. In the described training process the value of the connection weights is stored and used during training.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
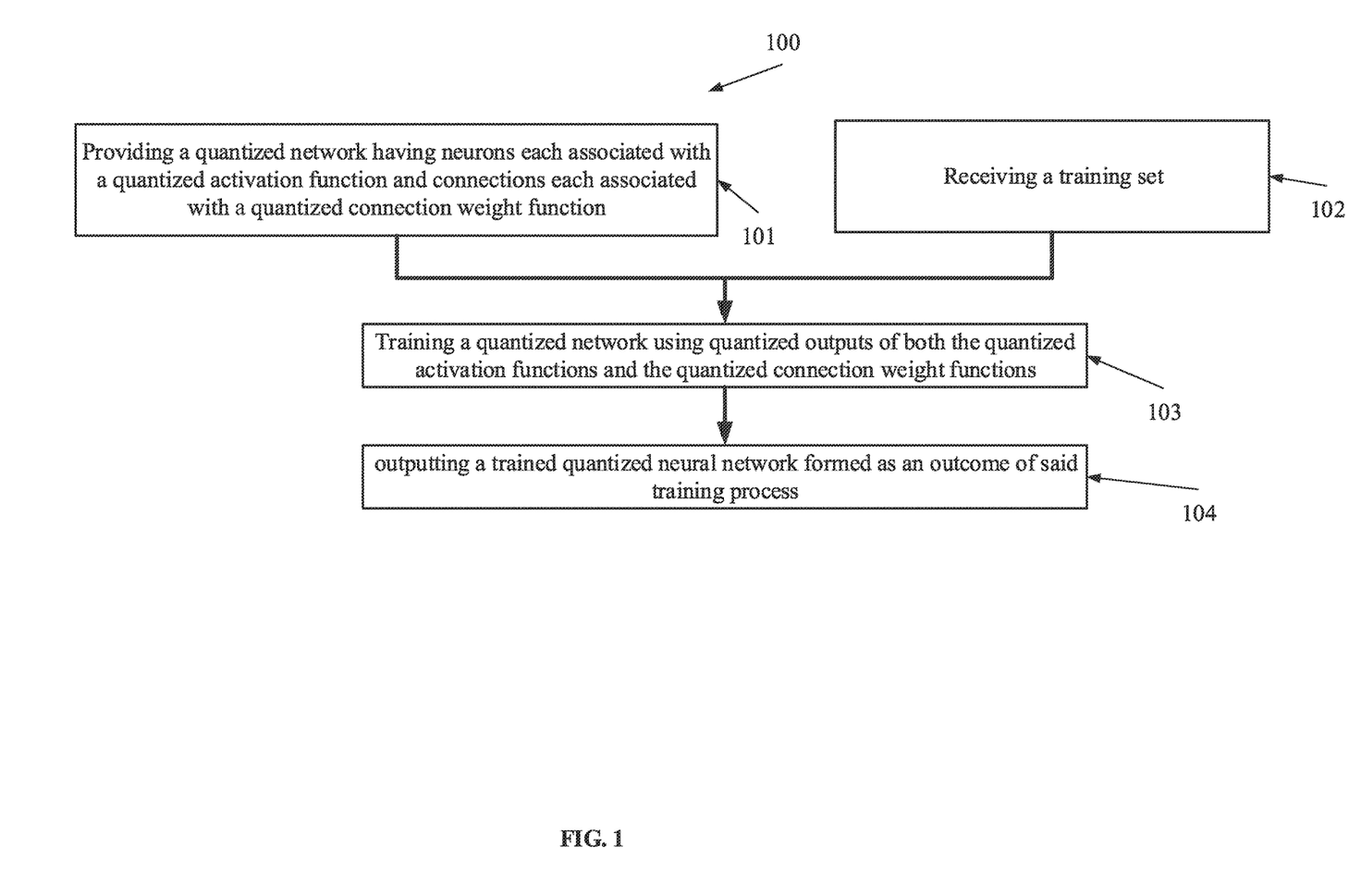
FIG. 1 is a method training a neural network, according to some embodiments of the present invention.

Reference is now made to FIG. 1 which is a method for training a neural network having neurons with quantized activation functions for calculating quantized activation value connected by connections with quantized weight functions for calculating quantized weights, optionally binary, weights and referred to herein as a quantized neural network (QNN) for inference or otherwise analyzing new data, according to some embodiments of the present invention. The training is done at a training phase such that at run-time both the quantized activation functions and the quantized weight functions are set to provide quantized values for computing parameter gradients.

Quantized activation functions and quantized weight functions are functions having a finite set of outputs. Optionally, the asset of outputs is binary. In such case the QNN may be referred to as a binary neural network (BNN). Quantized activation functions may be used for binarization of floating point connection weight and floating point activation values (e.g. outputs of activation functions) or for reduction of the floating point connection weight and floating point activation values to more than 1-bit per weight value and 1-bit per activation value, for instance any of 2-16 bits for a prediction accuracy comparable to 32 bits counterparts.

Optionally, the activation functions and quantized weight functions having an output selected from a group of 4, 8, 16, 32, 64, 128, 256, 512 and 1024 possible outputs which are represented in bits, optionally 2, 3, 5, 6, 7, 8, 9, and 10 bits.

The neural network may be any DNN, including any feed-forward artificial neural network such as a convolutional neural network (CNN), fully connected neural network (FNN) and/or recurrent neural network (RNN).

During a training phase, as further indicated below, a floating point weight value and a quantized weight value are stored per connection and optionally, a batch normalization parameters are stored per neuron. Optionally, for an inference phase, the training phase outputs a neural network without floating point weight value per connection and only with a quantized weight value per connection. Optionally no a batch normalization value is stored per neuron in the outputted neural network.

As indicated herein, the method allows reducing power consumption and computational complexity both in the training phase and in the inference phase. As such the method may be implemented on mobile devices such as Smartphones, tablets, and/or even wearable items.

Figure 2:
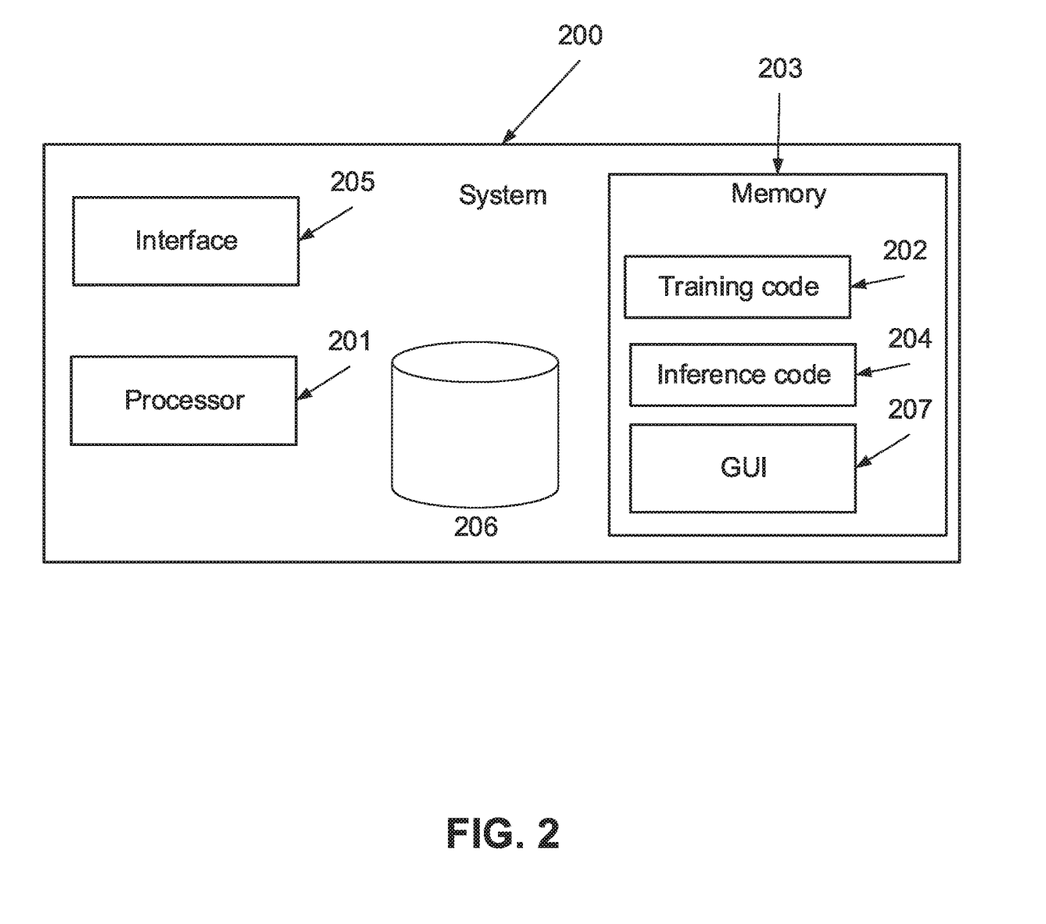
FIG. 2 is a computing device having a one or more processors (201) such as servers, virtual machines, processors, graphical processing units (GPUs) and/or the like, according to some embodiments of the present invention.

Reference is also made to FIG. 2 which is a computing device having a one or more processors 201 such as servers, virtual machines, processors, graphical processing units (GPUs) and/or the like, according to some embodiments of the present invention. Optionally, the computing device is a mobile device. Optionally, the computing device is a virtual machine executed on a plurality of servers which are connected to a network.

The one or more processors 201 executes a training code 202 stored in a memory 203 for using a training set such as an input dataset or a dataset stream for training a neural network, optionally a QNN or a BNN, as further described below. For training, an input dataset or dataset stream may be received via an interface 205 such as a sensor interface, a network interface and/or a storage interface.

Additionally or alternatively, the one or more processors 201 executes an inference code 204 stored in the memory 203 for using a trained neural network, optionally the QNN or the BNN for inference where capabilities learned during training are used, for instance classification of a data input (e.g. determining, identifying, estimating and/or otherwise concluding a conclusion regarding the data input), as further described below. For inference phase, the data input may be received via the interface 204.

The input dataset or dataset stream may be stored in a database 206. A graphical user interface (GUI) 207 may be provided to allow a user to define input data, receive training indication and/or an output of inference process as described below.

At the training phase, first, as shown at 101, a neural network model is constructed and/or received according to code instructions. The neural network model is a QNN or a BNN having a plurality of neurons each having a quantized activation function such as a binary activation function or a quantized activation function adapted to output a selected member of a finite set as described herein. The neurons are arranged in a plurality of layers and are connected by connections. Each connection has a quantized connection weight function such as a binary connection weight function.

For the training phase (also referred to as a learning phase), both the quantized weight functions and the quantized activation functions are set to provide a quantized value such as a binary value for instance either +1 or −1 respectively. The quantized values are based on the outputs of the quantized weight functions and/or floating point values of the connection weights and the outputs of the quantized activation functions.

Optionally, a quantized function is a binary activation function which is implemented as a deterministic function. Such a deterministic function may be defined as follows:

$$x^b = \text{Sign}(x) = \begin{cases} +1 & \text{if } x \geq 0, \\ -1 & \text{otherwise,} \end{cases}$$

where $x^b$ denotes a binarized variable and x a floating point value of an outcome of a quantized weight function or a quantized activation function of a neuron or a connection of the trained neural network, for instance a BNN.

Optionally, a quantized function is a binary activation function which is implemented as a stochastic function. Such a stochastic function may be defined as follows:

$$x^b = \begin{cases} +1 & \text{with probability } p = \sigma(x), \\ -1 & \text{with probability } 1 - p, \end{cases}$$

where σ denotes a function such as a sigmoid function, for instance a hard sigmoid function which may be defined as follows:

$$\sigma(x) = \text{clip}\left(\frac{x+1}{2}, 0, 1\right) = \max\left(0, \min\left(1, \frac{x+1}{2}\right)\right)$$

When the quantized function is not a binary activation function, the stochastic function may use a random bit generator for generating random bits for quantization.

As shown at 102, a training set is received, for instance designated by using the GUI 207, uploaded linked or otherwise selected. The training set may be image data, video data, speech data, textual content, genetic data, medical data such as outputs of image modality, for example CT, MRI, PET-CT and/or medical test outcomes, such as blood test, blood pressure. The data may be normalized and/or canonized. Now, as shown at 103, the QNN, for instance the BNN is trained based on the output of the quantized functions (both quantized activation functions and the quantized connection weight functions) while non quantized values of connection weights are stored and used. During the training, parameter gradients such as weight gradients are computed based on outputs of the quantized connection weight functions and quantized activation functions for forward passes and backward passes (i.e. backpropagation actions). For example the weight gradients are calculated during backpropagation sub-processes by computing a plurality of neuron gradients where each of the neuron gradients is of an output of a quantized activation function in one layer with respect to an input of that quantized activation function. Each of the neuron gradients is calculated such that when an absolute value of the input is smaller than a positive constant threshold value, for instance 1, the respective neuron gradient is set as a positive constant output value and when the absolute value of the input is smaller than the positive constant threshold value the neuron gradient is set to zero. This allows updating the floating point connection weight values of the connections according to the plurality of weight gradients. This allows using floating point connection weight values for gradient descent calculated during the training phase, for instance stochastic gradient descent (SGD). The SGD requires exploring a space of parameters in small and noisy process steps where noise is averaged out by stochastic gradient contributions accumulated in each connection weight.

Reference is now made to an exemplary description of the training phase where C denotes a cost function for a mini-batch gradient descent (gradient descent of a subset of the training set), λ denotes a learning rate decay factor, L denotes a number of layers, and o denotes element-wise multiplication. A binarization function, referred to herein as Binarize( ), binarizes (e.g. stochastically or deterministically) a floating point value of a neuron (floating point activation values) and/or a connection weight value (floating point weights). This function may be replaced with a quantization function that outputs a finite set of outcomes based on a floating point value of a neuron and/or a connection weight value.

A clip function, referred to herein as Clip( ), clips floating point connection weight values.

A normalization function, referred to herein as Batch-Norm( ), batch-normalizes floating point activation values of neurons, by a batch normalization (BN). The BN accelerates the training and reduces the overall impact of a weight scale. In particular, at train-time training a BN requires many multiplications as the standard deviation is calculated and the BN is divided by a running variance (e.g. a weighted mean of a training set activation variance. The number of scaling calculations is optionally the same as the number of neurons of the QNN or the BNN. For example, in a CIFAR-10 dataset, the first convolution layer is consisting of 128×3×3 filter masks and converts an image of size 3×32×32 to size 3×128×28×28 that is two orders of magnitude larger than the number of weights.

Optionally, the BN is held as described in Ioffe, S. and Szegedy, C. Batch normalization: Accelerating deep network training by reducing internal covariate shift 2015 which is incorporated herein by reference.

Optionally a shift-based batch normalization (SBN) technique is used for approximating the BN almost without multiplications. The SBN, also referred to as a shift-based variant, a shift based batch normalizing transform is applied to activation value x over a mini-batch (subset of the training set) where the approximate power-of-2 is $AP2(x)=\text{sign}(x) 2^{\text{round}(\log_2 |x|)}$ and Ø denotes both left shift and right binary shift. The following is based on values of x which are over a mini-batch: $B=\{x_1 \ldots m\}$ and the parameters to learn are $\gamma$, $\beta$ and ensures that $\{y_i=BN(x_i, \gamma, \beta)\}$ where BN denotes batch normalization:

{1. Mini-batch mean:}

$$\mu_B \leftarrow \frac{1}{m}\sum_{i=1}^{m} x_i$$

{2. Centered input:}

$$C(x_i) \leftarrow (x_i - \mu_B)$$

{3. Approximate variance:}

$$\sigma_B^2 \leftarrow \frac{1}{m}\sum_{i=1}^{m}(C(x_i)\oslash AP2(C(x_i)))$$

{4. Normalize:}

$$\hat{x}_i \leftarrow C(x_i)\oslash AP2\left(\left(\sqrt{\sigma_B^2+\epsilon}\right)^{-1}\right)$$

{5. Scale and shift:}

$$y_i \leftarrow AP2(\gamma)\oslash \hat{x}_i$$

The function referred to herein as BackBatchNorm( ) backpropagates through the normalization and the function Update( ) updates learnt parameters when their gradients are known. This function may be as defined in Kingma, D. and Ba, J. Adam: A method for stochastic optimization. arXiv preprint arXiv:1412.6980, 2014 or by a shift based AdaMax learning rule where $g_t^2$ denotes an element-wise square rule $g_t \circ g_t$ and Ø denotes both left bit-shift and right bit-shift. A default settings may be $\alpha=2^{-10}$, $1-\beta_1=2^{-3}$, $1-\beta_2=2^{-10}$ and operations on vectors are element-wise. $\beta_1^t$ and $\beta_2^t$ denote $\beta_1$ and $\beta_2$ to the power of t. This is held when previous parameters $\theta_{t-1}$ and their parameter gradient such as weight gradient $g_t$ are with a learning rate $\alpha$. This ensures updating parameters $\theta_t$ biased $1^{st}$ and $2^{nd}$ moment estimates:

$m_t \leftarrow \beta_1 \cdot m_{t-1}+(1-\beta_1)\cdot g_t$
$v_t \leftarrow \max(\beta_2 \cdot v_{t-1}, |g_t|)$
{Updated parameters:}
$\theta_t \leftarrow \theta_{t-1}-(\alpha\oslash(1-\beta_1))\cdot \hat{m}\oslash v_t^{-1})$ The training phase requires a minibatch of inputs and targets $(a_0; a^*)$, previous connection weights W, previous BatchNorm parameters θ, weight initialization coefficients, for example as defined in Glorot, X. and Bengio, Y. Understanding the difficulty of training deep feedforward neural networks. In AISTATS'2010, 2010 which is incorporated herein by reference and a previous learning rate η. This ensures updated weights $W^{t+1}$, updated BatchNorm parameters $\theta^{t+1}$ and updated learning rate $\eta^{t+1}$ and allows computing neuron gradients during forward propagation (forward passes) as follows:

for k=1 to L do
 $W_k^b \leftarrow \text{Binarize}(W_k)$, $s_k \leftarrow a_{k-1}^b W_k^b$
 $a_k \leftarrow \text{BatchNorm}(s_k, \theta_k)$
 if k<L then $a_k^b \leftarrow \text{Binarize}(a_k)$ and during backpropagation ((backward passes) as follows (neuron gradients are not binary):

Compute $g_{a_L} = \frac{\partial C}{\partial a_L}$ knowing $a_L$ and $a^*$ for $k = L$ to 1 do if $k < L$ then $g_{a_k} \leftarrow g_{a_k^b} \circ 1_{|a_k|\leq 1}$ $(g_{s_k}, g\theta_k) \leftarrow \text{BackBatchNorm}(g_{a_k}, s_k, \theta_k)$ $g_{a_{k-1}^b} \leftarrow g_{s_k} W_k^b, g_{w_k^b} \leftarrow g_{s_k}^T a_{k-1}^b$ Now, parameter gradients are accumulated as follows:
for k=1 to L do
 $\theta_k^{t+1} \leftarrow \text{Update}(\theta_k, \eta^t, g_{\theta_k}), \eta^{t+1}\leftarrow \lambda \eta^t$
 $W_k^{t+1} \leftarrow \text{Clip}(\text{Update}(W_k, \gamma_k \eta^t, g_{W_k^b}), -1, 1)$
where a straight-through estimator of $\partial C/\partial r$ is $g_r=g_g 1_{|r|\leq 1}$.
The above described training preserves the backpropagated gradients when the absolute value of r is smaller than 1 and cancels the backpropagated gradients when the absolute value of r is larger than 1; as not cancelling the neuron gradient when the absolute value of r is larger than 1 significantly worsens the performance. It should be noted that 1 can be replaced with any positive constant. The derivative $1_{|r|\leq 1}$ may be a seen as the neuron gradient of a hard tan h, that denotes a piece-wise linear activation function such as H tan $h(x)=\text{Clip}(x;-1; 1)$.

Optionally, the quantized weight functions and the quantized activation functions are sign functions. For hidden units, namely neurons at the layers which are not the input layer or the output layer, sign function nonlinearity is used to obtain quantized activation values such as binary activations, and for connection weight values the following two are combined:

First, during the training phase, each floating point connection weight value is optionally constrained between −1 and 1, for instance by projecting $w^r$ to −1 or 1 when a connection weight value update brings $w^r$ outside of [−1; 1]. This is done for example by clipping connection weight values during training as indicated above. The floating point connection weight values would otherwise grow without any impact on the binary weights and increase computation without need.

Second, when a weight $w^r$ is used, $w^r$ is quantized using $w^b=\text{Sign}(w^r)$. This is consistent with gradient canceling when $|w^r|>1$ when the formed QNN or BNN is executed.

The training creates a QNN, such as a BNN with L layers that optionally requires a vector of 8-bit inputs $\alpha_0$, binary weights $W^b$, and BatchNorm parameters $\theta$. This ensures a multilayer perceptron (MLP) output $\alpha_L$ where the input layer (i.e. first layer) is defined as follows:

$\alpha_1 \leftarrow 0$
for n=1 to 8 do
$\quad \alpha_1 \leftarrow =_1 2^{n-1}$, XnorDotProduct($a_0^n$, $W_1^b$)
$\alpha_1^b \leftarrow$ Sign(BatchNorm($\alpha_1, \theta_1$))
and the other layers are defined as follows:
for k=2 to L−1 do
$\quad \alpha_k \leftarrow$ XnotDotProduct($\alpha_{k-1}^b$, $W_b^b$)
$\quad \alpha_k^b \leftarrow$ Sign(BatchNorm($\alpha_k, \theta_k$))
{3. Output layer:}
$\alpha_L \leftarrow$ XnorDotProduct($\alpha_{L-1}^b$, $W_L^b$)
$\alpha_L \leftarrow$ BatchNorm($\alpha_L, \theta_L$)

Now, as shown at 104, the trained neural network is outputted, for instance as an inference object for inference. The inference object may be a script or a code or instructions to update an inference object or code. The inference object may be a table of values representing parameters such as the quantized connection weight values, quantized activation functions and BNs. The inference object, interchangeably referred to as a trained neural network, may be used for inference, for instance for classifying various types of data including images, videos, textual and/or numerical data, medial information and/or the like. The inference may include determining identities, identifying objects, recognizing text, calculating risk scores, identifying risks, providing a medical indication such as a presence or an absence of a pathology and/or a suggested treatment and/or the like. To reduce computational complexity of the inference phase, the calculation of the classification based on the trained neural network may be based only the quantized, optionally binarized, values of the floating point weight values and the outputs of the quantized activation functions. In the trained network, the output of one layer is an input of the following layer and all the layers inputs are binary with the exception of the input layer.

Optionally, the trained network, for example a QNN or a BNN, has the architecture of a CNN and is adapted to receive as an input data including images or video and the trained neural network for computer vision implementation, the data has far fewer channels (e.g. red, green and blue) than internal representations (e.g. 512). As a result, the first layer of such a trained neural network is the smallest among the other convolution layers, both in terms of parameters and computations; see for example Szegedy, C., Liu, W., Jia, Y., et al. Going deeper with convolutions, Technical report, arXiv:1409.4842, 2014 which is incorporated herein by reference.

Continuous-valued inputs may be handed as fixed point numbers with m bits of precision. For example, in the common case of 8-bit fixed point inputs:

$$s = x \cdot w^b; s = \sum_{n=1}^{8} 2^{n-1}(x^n \cdot w^b),$$

where x denotes a vector of 1024 8-bit inputs, X denotes the most significant bit of the first input, $w^b$ denotes a vector of 1024 1-bit weights, and s denotes a resulting weighted sum.

Optionally, a straight-through estimator is applied to take into account a saturation effect using deterministic sampling of the bits. For example, a sign function quantization q=Sign (r) may be applied when an estimator $g_q$ of gradient $\partial C/\partial q$ is obtained with a straight-through estimator when needed).

The trained neural network formed by a training process as described above leads to dramatic improvements in both power consumption and computation speeding relation to known training processes, for instance as exemplified in the examples described below. In the above described training phase and inference phase, memory size and accesses are reduced during the forward passes and most arithmetic operations are replaced with bit-wise operations. The power efficiency is improved by more than one order of magnitude as can be estimated from the tables in FIGS. 4 and 5. As exemplified below, the BNN formed by a training process as described above handles benchmark datasets such as MNIST, CIFAR-10 and SVHN datasets while achieving about state-of-the-art accuracy performance. As exemplified below, the QNN, for example the BNN, formed by a training process on the Kmamark dataset ImageNet significantly improve previous attempts to compress ImageNet-capable architectures.

Various embodiments and aspects of the present invention as delineated hereinabove and as claimed in the claims section below find experimental support in the following examples.

EXAMPLES

Reference is now made to the following examples which together with the above description illustrate some embodiments of the invention in a non limiting fashion.

Figure 3:
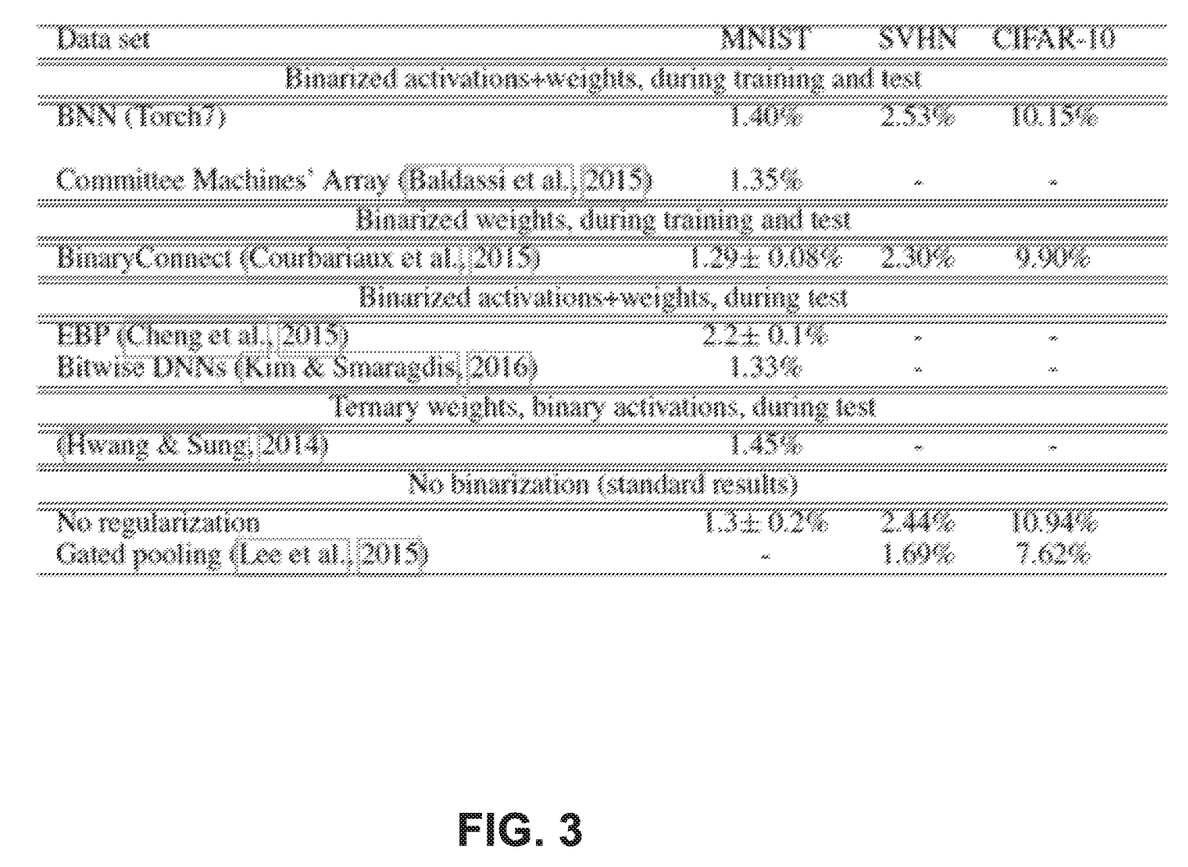
FIG. 3 is a table for classification of test error rates of DNNs trained on MNIST (fully connected architecture), CIFAR-10 and SVHN (convnet) datasets where no unsupervised pre-training or data augmentation was used, according to some embodiments of the present invention.

Reference is now made to two sets of experiments, each based on a different framework, namely Torch7. Results are detailed in Table presented in FIG. 3 that compares classification test error rates of DNNs trained on MNIST (fully connected architecture), CIFAR-10 and SVHN (convnet). No unsupervised pre-training or data augmentation was used.

To test the strength of the above described training method, the above described training method was applied to classify the ImageNet dataset. Considerable research has been concerned with compressing ImageNet architectures while preserving high accuracy performance; see for example Han, S., Mao, H., and Dally, W. J. Deep compression: Compressing deep neural networks with pruning, trained quantization and Huffman coding. arXiv preprint arXiv:1510.00149, 2015a. Previous approaches that have been tried include pruning near zero weights using matrix factorization techniques, quantizing the weights and applying Huffman codes among others. To the best of our knowledge, so far there are no reports on successfully quantizing the network's activations. Moreover, a recent work Han, S., Mao, H., and Dally, W. J. Deep compression: Compressing deep neural networks with pruning, trained quantization and Huffman coding. arXiv preprint arXiv:1510.00149, 2015a showed that accuracy significantly deteriorates when trying to quantize convolutional layers' weights below 4 bits (FC layers are more robust to quantization and can operate quite well with only 2 bits). The above described training method was applied to tackle the task of binarizing both weights and activations by employing the AlexNet and GoogleNet architectures. This implementation achieved 36:1% top-1 and 60:1% top-5 accuracies using AlexNet and 47:1% top-1 and 69:1% top-5 accuracies using GoogleNet. This performance is better than all previous attempts to compress ImageNet architectures using less than 4 bits precision for the weights. Moreover, this advantage is achieved while also binarizing neuron activations.

Relaxing binary constrains and allowing more than 1-bit per weight value and 1-bit per activations value results in a QNN that achieves prediction accuracy comparable to 32-bit counterparts. For example, a quantized version of AlexNet with 1-bit weights and 2-bit activations achieves 51% top-1 accuracy and GoogleNet with 4-bits weighs and activation achieved 66:6%. Moreover, quantize the parameter gradients to 6-bits as well which enables gradients computation using only bit-wise operation.

The following exemplify high power efficiency during the Forward Pass. As commonly known computer hardware, be it general-purpose or specialized, is composed of memories, arithmetic operators and control logic. During the forward pass (both at run-time and train-time), using a QNN such as a BNN trained as described above drastically reduces memory size and accesses, and replace most arithmetic operations with bit-wise operations, which might lead to a great increase in power-efficiency. Moreover, a quantized CNN such as a binarized CNN can lead to binary convolution kernel repetitions. Dedicated hardware reduces the time complexity by about 60%.

Figure 4:
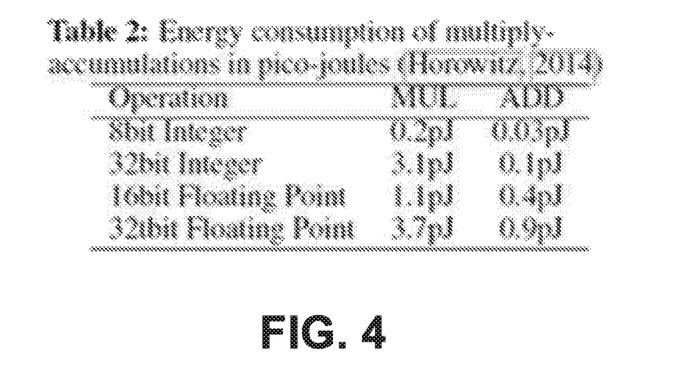
FIGS. 4-5 are tables of energy consumption of multiply accumulations in pico-joules and energy consumption of memory accesses in pico-joules.
Figure 5:
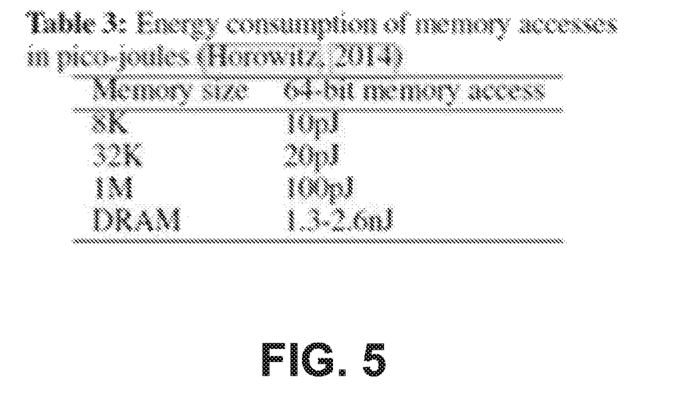

Improving computing performance has always been and remains a challenge. Over the last decade, power has been the main constraint on performance, see Horowitz, 2014. This is why much research effort has been devoted to reducing the energy consumption of neural networks. Horowitz (2014) provides rough numbers for the energy consumed by the computation (the given numbers are for 45 nm technology), as summarized in the tables provided in FIGS. 4 and 5. FIGS. 4 and 5 indicate that memory accesses typically consume more energy than arithmetic operations, and memory access cost augments with memory size. In comparison with 32-bit DNNs, a trained neural network such as the BNN, requires 32 times smaller memory size and 32 times fewer memory accesses. This is expected to reduce energy consumption drastically (i.e., more than 32 times). XNOR-Count Applying a DNN mainly consists of convolutions and matrix multiplications. The key arithmetic operation of deep learning is thus the multiply-accumulate operation. Artificial neurons are basically multiply-accumulators computing weighted sums of their inputs. In a trained neural network such as BNNs, both the activations and the weights are constrained to either −1 or +1. As a result, most of the 32-bit floating point multiply-accumulations are replaced by 1-bit XNOR-count operations. This has a big impact on dedicated deep learning hardware, for example by reducing the number of used field-Programmable Gate Array (FPGA) slices. For instance, a 32-bit floating point multiplier costs about 200 Xilinx FPGA slices, see Govindu, G., Zhuo, L., Choi, S., and Prasanna, V. Analysis of high-performance floating-point arithmetic on FPGAs. In Parallel and Distributed Processing Symposium, 2004. Proceedings. 18th International, pp. 149. IEEE, 2004 and Beauchamp, M. J., Hauck, S., Underwood, K. D., and Hemmert, K. S. Embedded floating-point units in FPGAs. In Proceedings of the 2006 ACM/SIGDA 14th international symposium on Field programmable gate arrays, pp. 12-20. ACM, 2006 which are incorporated herein by reference, whereas a 1-bit XNOR gate only costs a single slice.

In one example, the above described training process was used on a CNN. When using CNN architecture with binary weights, the number of unique filters is bounded by the filter size. For example, in an exemplary implementation, filters of size 3×3, so the maximum number of unique 2 dimensional (2D) filters is $2^9$=512. Since binary filters are used in the above described training process, many 2D filters of size k×k repeat themselves. By using dedicated hardware and/or software modules, only the unique 2D filters may be applied on each feature map and sum the results to receive each convolutional result of a three dimensional (3D) filter. For example, in a CNN architecture trained on the CIFAR-10 benchmark, there are only 42% unique filters per layer on average. Hence the number of the XNOR-pop count operations may be reduced by 3 to implement the above described training process.

Figure 6:
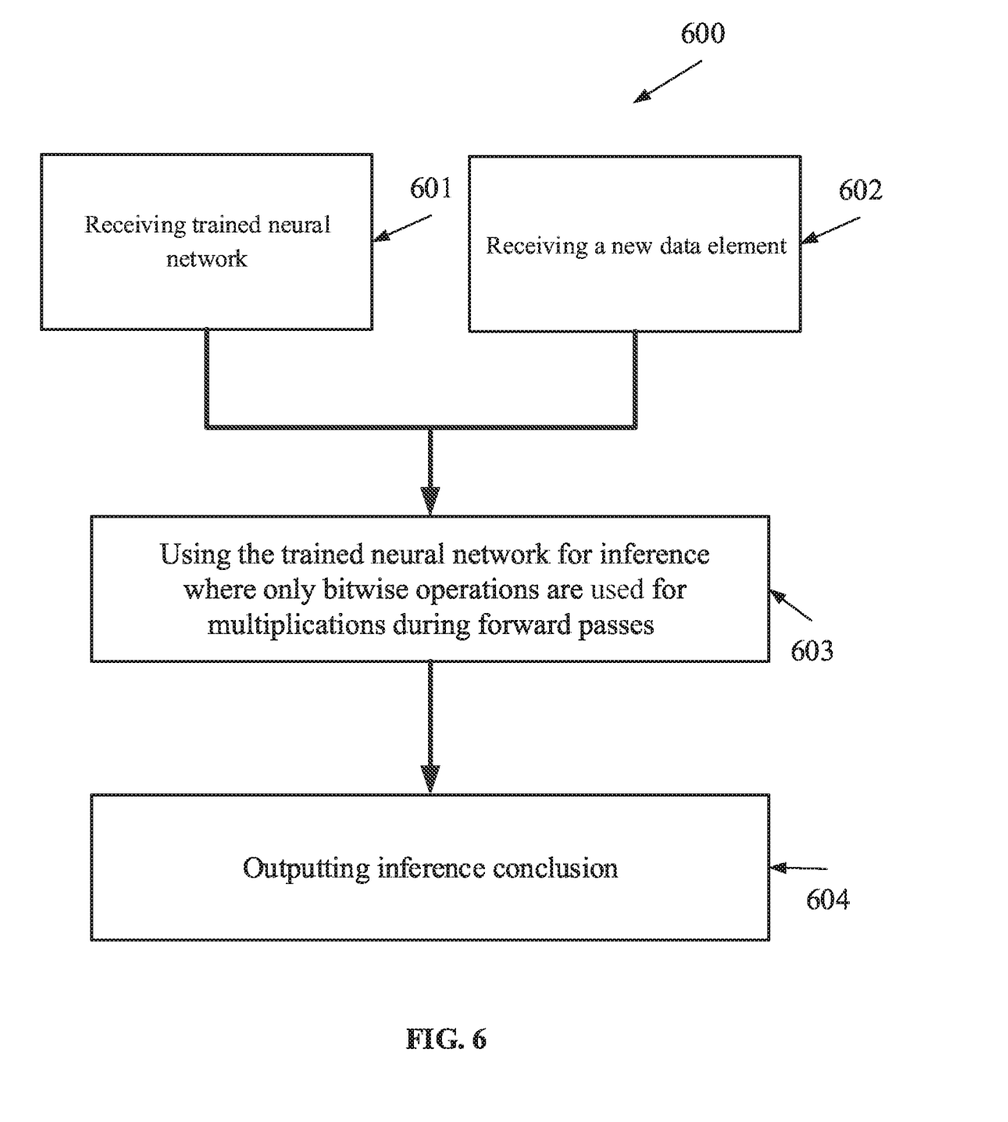
FIG. 6 is a flowchart of a method of using a neural network trained according to some embodiments of the present invention.

Reference is now made to FIG. 6 which is a flowchart of a method of using a trained neural network, such as a neural network trained as described above with reference to FIG. 1, for instance a QNN or a BNN, according to some embodiments of the present invention. The trained neural network may be any classification or inference object, for instance a code or a script, either executed as software on one or more processor or as a designated firmware or any designated hardware for instance FPGA.

First, as shown at 601, a neural network trained by a training set and having a plurality of neurons each associated with a quantized activation function adapted to output a quantized activation value selected from a first finite set is provided The plurality of neurons are arranged in a plurality of layers and connected by a plurality of connections. Each connection is associated with a quantized connection weight value selected from a second finite set, for instance a binary value. Optionally only a quantized connection weight value is associated with each connection (e.g. no floating point value is associated with each connection).

Now, as shown at 602, new data element is received. The new data element may be image data, video data, textual content, audio data, genetic data, and medical data such as outputs of image modality, for example CT, MRI, PET-CT and/or medical test outcomes, such as blood test, blood pressure. The data may be normalized and/or canonized. The new data element may be designated using the GUI 207.

Now, as shown at 603, the trained neural network is used for inferencing a conclusion regarding the data element by forward pass process(es). As the neurons of the trained neural network are associated with quantized activation functions and as the connections are associated with quantized connection weight values, the forward pass process(es) may be held only bitwise operations for multiplying respective quantized connection weight values and respective quantized activation values. This allows reducing computational complexity and power consumption in a substantial manner and outputting the conclusion, for instance to a display, for example to the GUI. The output may be used for mobile devices, automatically operating robotic systems such as car and/or for decision making in an artificial intelligence system or device.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a module, a processor, a connection weight function and an activation function is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for training neural networks, comprising:
   constructing a neural network model having a plurality of neurons each associated with a quantized activation function adapted to output a quantized activation value, said plurality of neurons are arranged in a plurality of layers and being connected by a plurality of connections each associated with one of a plurality of quantized connection weight functions;
   receiving a training set dataset;
   using said training set dataset for training said neural network model and calculating accordingly a trained neural network model, said training includes a plurality of backpropagation sub-processes wherein in each of the plurality of backpropagation sub-processes the following is performed:
     computing a plurality of first layer neuron gradients each based on an output of a respective said quantized activation function of one of the plurality of neurons in a first layer of said plurality of layers,
     backpropagating each of the plurality of first layer neuron gradients as a gradient input to a another quantized activation function of another of the plurality of neurons in a second layer of said plurality of layers for calculating one of a plurality of second layer neuron gradients, when an absolute input value to the quantized activation function is smaller than a positive constant threshold value, a respective second neuron gradient of said second neuron gradients is based on the first layer neuron's gradient and when the absolute input value of said input is larger than said positive constant threshold value said respective second neuron gradient is set to zero,
     computing based on the plurality of first and second neuron gradients a plurality of weight gradients; and
     updating a plurality of floating point connection weight values according to said plurality of weight gradients each of the plurality of floating point connection weight values is used for obtaining the plurality of quantized connection weight functions;
   wherein the training of the said neural network model includes a forward propagation process executed using the plurality of quantized connection weight functions.

2. The method of claim 1, wherein each of said plurality of connections is associated with one of said plurality of floating point connection weight values.

3. The method of claim 1, wherein said neural network model is a convolutional neural network (CNN) model and said trained quantized neural network is a trained quantized CNN.

4. The method of claim 1, wherein said quantized activation function is a binary function and said quantized activation value is a binary value.

5. The method of claim 1, wherein said quantized connection weight function is a binary function and said quantized connection weight value is a binary value.

6. The method of claim 1, wherein quantized connection weight value and said quantized activation value are binary values.

7. The method of claim 1, wherein said quantized activation function and said quantized connection weight function are deterministic functions.

8. The method of claim 1, wherein said quantized activation function and said quantized connection weight function are stochastic functions.

9. The method of claim 8, wherein said stochastic functions are hard sigmoid functions.

10. The method of claim 1, wherein said gradient input is propagated through the batch normalization layer's gradients.

11. The method of claim 1, wherein said gradient input is scaled and shifted according to at least one constant value.

12. The method of claim 1, wherein said gradient input is scaled and shifted according to the gradients of a batch normalized input of the forward pass calculated by approximating variance of values of at least one minibatch of said training set and normalizing said values of said at least one minibatch of said training set.

13. The method of claim 12, wherein multiplications of said batch normalization are performed using left and right bit-shift operations.

14. The method of claim 2, further comprising updating said plurality of floating-point connection weight values during said backpropagation sub-processes by performing multiplication operations using left and right bit-shift operations.

15. A system for training neural networks, comprising:
a storage comprising a neural network model having a plurality of neurons each associated with a quantized activation function, said plurality of neurons are arranged in a plurality of layers and being connected by a plurality of connections each associated with one of a plurality of quantized connection weight functions;
at least one processor coupled to the storage for executing a code comprising:
using a training set dataset to train said neural network model and calculating accordingly a trained neural network model, said training includes a plurality of backpropagation sub-processes wherein in each of the plurality of backpropagation sub-processes the following is performed:
computing a plurality of first layer neuron gradients each based on an output of a respective said quantized activation function of one of the plurality of neurons in a first layer of said plurality of layers,
backpropagating each of the plurality of first layer neuron gradients as a gradient input to a another quantized activation function of another of the plurality of neurons in a second layer of said plurality of layers for calculating one of a plurality of second layer neuron gradients, when an absolute input value to the quantized activation function is smaller than a positive constant threshold value, a respective second neuron gradient of said second neuron gradients is based on first layer neuron gradient and when the absolute input value of said input is larger than said positive constant threshold value said respective second neuron gradient is set to zero,
computing based on the plurality of first and second neuron gradients a plurality of weight gradients; and
updating a plurality of floating point connection weight values according to said plurality of weight gradients each of the plurality of floating point connection weight values is used for obtaining the plurality of quantized connection weight functions;
wherein the training of the said neural network model includes a forward propagation process executed using the plurality of quantized connection weight functions.

16. A method for using a trained neural network, comprising:
providing a neural network trained on a training set and having a plurality of neurons each associated with a quantized activation function adapted to output a quantized activation value, said plurality of neurons are arranged in a plurality of layers and being connected by a plurality of connections each associated with a quantized connection weight value selected from a second finite set;
receiving a new data element;
using said trained neural network for inferencing a conclusion regarding said data element by at least one forward pass process during which only bitwise operations are held to multiply respective said quantized connection weight values and respective said quantized activation values; and
outputting said conclusion;
wherein the neural network is trained in a plurality of backpropagation sub-processes wherein in each of the plurality of backpropagation sub-processes the following is performed:
computing a plurality of first layer neuron gradients each based on an output of a respective quantized activation function of one of the plurality of neurons in a first layer of said plurality of layers,
backpropagating each of the plurality of first layer neuron gradients as a gradient input to a quantized activation function of another of the plurality of neurons in a second layer of said plurality of layers for calculating one of a plurality of second layer neuron gradients, when an absolute input value to the quantized activation function is smaller than a positive constant threshold value, a respective second neuron gradient of said second neuron gradients is based on the first layer neuron's gradient and when the absolute input value of said input is larger than said positive constant threshold value said respective second neuron gradient is set to zero,
computing based on the plurality of first and second neuron gradients a plurality of weight gradients, and
updating a plurality of floating point connection weight values according to said plurality of weight gradients, each of the plurality of floating point connection weight values is used for obtaining the plurality of quantized connection weight functions;
wherein the training of the said neural network model includes a forward propagation process executed using the plurality of quantized connection weight functions.

17. The method of claim 16, wherein said bitwise operations are XNOR-count operations and population count operations.

\* \* \* \* \*